US010054349B2

(12) United States Patent
Iwasaki et al.

(10) Patent No.: US 10,054,349 B2
(45) Date of Patent: Aug. 21, 2018

(54) AIR-CONDITIONING APPARATUS

(75) Inventors: Kazuhisa Iwasaki, Tokyo (JP);
Naomichi Tamura, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 721 days.

(21) Appl. No.: 14/399,238

(22) PCT Filed: Jul. 20, 2012

(86) PCT No.: PCT/JP2012/004624
§ 371 (c)(1),
(2), (4) Date: Nov. 6, 2014

(87) PCT Pub. No.: WO2014/013528
PCT Pub. Date: Jan. 23, 2014

(65) Prior Publication Data
US 2015/0204592 A1  Jul. 23, 2015

(51) Int. Cl.
*F25B 41/04*  (2006.01)
*F25B 49/02*  (2006.01)
(Continued)

(52) U.S. Cl.
CPC ............ *F25B 49/022* (2013.01); *F24F 11/30* (2018.01); *F24F 11/62* (2018.01); *F25B 13/00* (2013.01);
(Continued)

(58) Field of Classification Search
CPC ................ F24F 11/006; F24F 11/0012; F24F 2011/0012; F24F 2011/0063;
(Continued)

(56) References Cited

U.S. PATENT DOCUMENTS 4,407,138 A * 10/1983 Mueller .............. F25D 21/006
62/126
5,477,698 A * 12/1995 Takegawa ............ F24F 11/0009
236/78 B
(Continued)

FOREIGN PATENT DOCUMENTS

JP       62237240 A    * 10/1987
JP    2001-254984 A      9/2001
(Continued)

OTHER PUBLICATIONS

Office Action dated Dec. 8, 2015 issued in corresponding JP patent application No. 2014-525568 (and English translation).
(Continued)

*Primary Examiner* — Elizabeth Martin
(74) *Attorney, Agent, or Firm* — Posz Law Group, PLC

(57) ABSTRACT

An air-conditioning apparatus includes an outdoor unit with a compressor, an outdoor heat exchange, a four-way valve for switching a refrigerant flow passage, and an outdoor flow control valve which controls the flow rate of a liquid refrigerant; and an indoor unit that includes an indoor heat exchanger, and an indoor flow control valve which reduces refrigerant pressure. A refrigerant circuit is formed by connecting the outdoor unit and at least one indoor unit by a pipe. A controller controls a component of the refrigerant circuit, based on the relationship between a first target set temperature used for temperature control of air to be conditioned and a preset second target set temperature.

9 Claims, 6 Drawing Sheets

(51) Int. Cl.
| | |
|---|---|
| *F25B 13/00* | (2006.01) |
| *F25D 17/06* | (2006.01) |
| *F25D 21/00* | (2006.01) |
| *F24F 11/30* | (2018.01) |
| *F24F 11/62* | (2018.01) |
| *F25B 47/02* | (2006.01) |
| *F24F 11/64* | (2018.01) |

(52) U.S. Cl.
CPC ............ *F25B 41/046* (2013.01); *F25B 49/02* (2013.01); *F25D 17/06* (2013.01); *F25D 21/004* (2013.01); *F24F 11/64* (2018.01); *F25B 47/025* (2013.01); *F25B 2313/0294* (2013.01); *F25B 2313/0311* (2013.01); *F25B 2313/0312* (2013.01); *F25B 2313/0313* (2013.01); *F25B 2600/02* (2013.01); *F25B 2600/0253* (2013.01); *F25B 2600/2513* (2013.01); *F25B 2700/1931* (2013.01); *F25B 2700/1933* (2013.01); *F25B 2700/21151* (2013.01); *F25B 2700/21152* (2013.01); *Y02B 30/741* (2013.01)

(58) Field of Classification Search
CPC ............ F25B 2700/21173; F25B 13/00; F25B 2313/0311; F25B 2313/0312; F25B 2313/0313; F25B 2700/1933
USPC ........... 62/156, 186, 190, 222, 228.1, 324, 6
See application file for complete search history.

(56) References Cited

U.S. PATENT DOCUMENTS

| | | | | |
|---|---|---|---|---|
| 6,094,920 | A * | 8/2000 | Kawase | G01K 3/005 236/78 R |
| 2002/0026803 | A1 * | 3/2002 | Inoue | F25B 13/00 62/228.3 |
| 2003/0116103 | A1 * | 6/2003 | Murakami | F01P 7/167 123/41.1 |
| 2005/0023363 | A1 * | 2/2005 | Sharma | H05K 7/20745 236/49.3 |
| 2006/0179855 | A1 * | 8/2006 | Lifson | F25B 13/00 62/160 |
| 2007/0137225 | A1 * | 6/2007 | Shindo | F24F 3/065 62/160 |
| 2009/0296780 | A1 * | 12/2009 | Lee | G01K 7/01 374/178 |
| 2010/0050672 | A1 * | 3/2010 | Kurihara | F25B 9/008 62/190 |
| 2010/0175400 | A1 * | 7/2010 | Kasahara | F25B 1/10 62/225 |
| 2012/0216556 | A1 * | 8/2012 | Kanbara | F24F 11/006 62/129 |
| 2012/0298347 | A1 * | 11/2012 | Maeda | F24F 11/006 165/201 |
| 2014/0100716 | A1 * | 4/2014 | Kawai | B60L 11/14 701/2 |

FOREIGN PATENT DOCUMENTS

| | | | |
|---|---|---|---|
| JP | 2003-028478 A | | 1/2003 |
| JP | 2003220826 A | * | 8/2003 |
| JP | 2006-250454 A | | 9/2006 |
| JP | 2007-139265 A | | 6/2007 |
| JP | 2009-198128 A | | 9/2009 |
| JP | 2010-078184 A | | 4/2010 |
| WO | 2011/101892 A1 | | 8/2011 |

OTHER PUBLICATIONS

International Search Report of the International Searching Authority dated Oct. 16, 2012 for the corresponding international application No. PCT/JP2012/004624 (and English translation).

* cited by examiner

AIR-CONDITIONING APPARATUS

CROSS REFERENCE TO RELATED APPLICATION

This application is a U.S. national stage application of PCT/JP2012/004624 filed on Jul. 20, 2012, the contents of which are incorporated herein by reference.

TECHNICAL FIELD

The present invention relates to an air-conditioning apparatus.

BACKGROUND

In conventional air-conditioning apparatuses which perform cooling, heating, and dehumidification (to be collectively referred to as "air-conditioning" hereinafter) of a room or the like (air-conditioned space), an indoor unit and an outdoor unit are connected to each other through a refrigerant pipe and an electric wire. In such an air-conditioning apparatus, a refrigerant circuit is formed using, as its main components, a compressor, an outdoor heat exchanger, an expansion mechanism, an indoor heat exchanger, and a four-way valve. The air-conditioning apparatus performs desired air-conditioning while switching the direction in which a refrigerant sent from the compressor circulates, by the operation of the four-way valve, using a heat pump (refrigeration cycle).

As such an air-conditioning apparatus, multi-unit air-conditioning apparatuses in which a plurality of indoor units are connected to a single outdoor unit by pipes have been known. Multi-unit air-conditioning apparatuses include an apparatus in which indoor units are able to independently perform an automatic cooling and heating operation and an apparatus in which indoor units are unable to independently perform an automatic cooling and heating operation. In the former air-conditioning apparatus, the indoor units are able to independently, selectively perform a cooling or heating operation. In contrast, the latter air-conditioning apparatus needs to select cooling or heating for all the indoor units, and be operated as a whole in the selected operation mode. Therefore, there is a challenge as to how to determine the operation mode of the air-conditioning apparatus. In particular, in an automatic operation mode in which either cooling or heating is automatically determined and performed, if the determination operation is done based on the states of individual indoor units, different determination results may be obtained. For the above-described reasons, it has generally been said that automatic operation control is difficult in multi-unit air-conditioning apparatuses. For example, frequent switching between cooling and heating may cause an unstable operation. Further, the change in room temperature may be large, resulting in a low-efficiency operation.

In order to solve such problems, for example, an air-conditioning apparatus is available, in which a plurality of indoor units perform operation in either a heating operation mode or a cooling operation mode. In this air-conditioning apparatus, for at least one set of indoor units of the plurality of indoor units, two temperatures are set such that the indoor temperature is controlled to fall within the range between the two set temperatures. The entire system can be switched to cooling or heating in accordance with the difference between the indoor temperature and each of the set temperatures of each of the indoor units. Further, for another set of indoor units of the plurality of indoor units, one temperature is set and the indoor temperature is controlled to be close to the set temperature, so that both comfort and energy conservation can be attained (see, for example, Patent Literature 1).

Also, even when the indoor environment in which a master unit is installed is significantly different from that in which a slave unit is installed, air-conditioning is performed in an operation mode corresponding to the indoor environment for the master unit. In order to solve a problem that a comfortable air-conditioning environment cannot be provided in a room in which a slave unit is installed, an air-conditioning system providing an operation control method and program for a multi-unit air-conditioning apparatus has been proposed, which is capable of providing a comfortable air-conditioning environment by selecting a suitable operation mode when an automatic operation mode is set (see, for example, Patent Literature 2).

PATENT LITERATURE

Patent Literature 1: International Publication No. WO 2011/101892 (FIG. 1)

Patent Literature 2: Japanese Unexamined Patent Application Publication No. 2007-139265 (FIG. 1)

In the above-mentioned known air-conditioning apparatus in which all of the plurality of indoor units perform a cooling or heating operation, the number of indoor units that require cooling and the number of indoor units that require heating are determined by comparing a set temperature with an indoor suction temperature (the air temperature before air-conditioning by an indoor unit). When the number of indoor units that require a heating operation is greater than the number of indoor units that require cooling, all the plurality of indoor units perform a heating operation. In contrast, when the number of indoor units that require a cooling operation is greater than the number of indoor units that require a heating operation, all of the plurality of indoor units perform a cooling operation.

However, for example, if the entire apparatus is switched to a heating operation after the set temperature for some of the indoor units is raised during a cooling operation in order to, for example, improve energy conservation, an excessive heating operation is performed so that the indoor temperature comes close to the set temperature. In contrast, for example, if the entire apparatus is switched to a cooling operation after the set temperature for some of the indoor units is lowered during a heating operation, an excessive cooling operation is performed so that the indoor temperature comes close to the set temperature. Accordingly, energy conservation cannot be improved.

Further, in the above-mentioned air-conditioning apparatus, since the start and stop of an indoor unit for controlling the indoor temperature to fall within the range between two set temperatures is simply determined on the basis of the set temperatures and the indoor suction temperature, it is difficult to stabilize the indoor temperature.

Furthermore, in the conventional air-conditioning system, an actuator control value is not set in accordance with a preset target set temperature and a target set temperature changed by the user, and operation is performed uniformly in accordance with a predetermined control value. Therefore, it may take a certain time to allow a stable operation, or it may be impossible to ensure sufficient quality when, for example, a failure is detected.

SUMMARY

The present invention has been made to solve the above-mentioned problems, and has as its object to obtain an air-conditioning apparatus capable of, for example, providing a stable operation state in a short period of time in accordance with a target set temperature.

An air-conditioning apparatus according to the present invention includes an outdoor unit that includes a compressor which compresses a refrigerant and discharges the compressed refrigerant, an outdoor heat exchanger which exchanges heat between outside air and the refrigerant, a switching valve for switching a flow passage of the refrigerant, and an outdoor flow control valve which controls a flow rate of a liquid refrigerant; and an indoor unit that includes an indoor heat exchanger which exchanges heat between air to be conditioned and the refrigerant, and an indoor flow control valve which reduces a pressure of the refrigerant. The outdoor unit and at least one indoor unit are connected by pipes to form a refrigerant circuit. The air-conditioning apparatus further comprises the controller that controls a component of the refrigerant circuit, based on a relationship between a first target set temperature used for temperature control of the air to be conditioned and a preset second target set temperature.

In an air-conditioning apparatus according to the present invention, a second target set temperature is further set to protect the apparatus, and how to control the apparatus is changed on the basis of the relationship between the first target set temperature and the second target set temperature. Accordingly, the apparatus (its constituent devices) can be protected to perform a stable operation in a short period of time.

DETAILED DESCRIPTION

Embodiment 1

Figure 1:
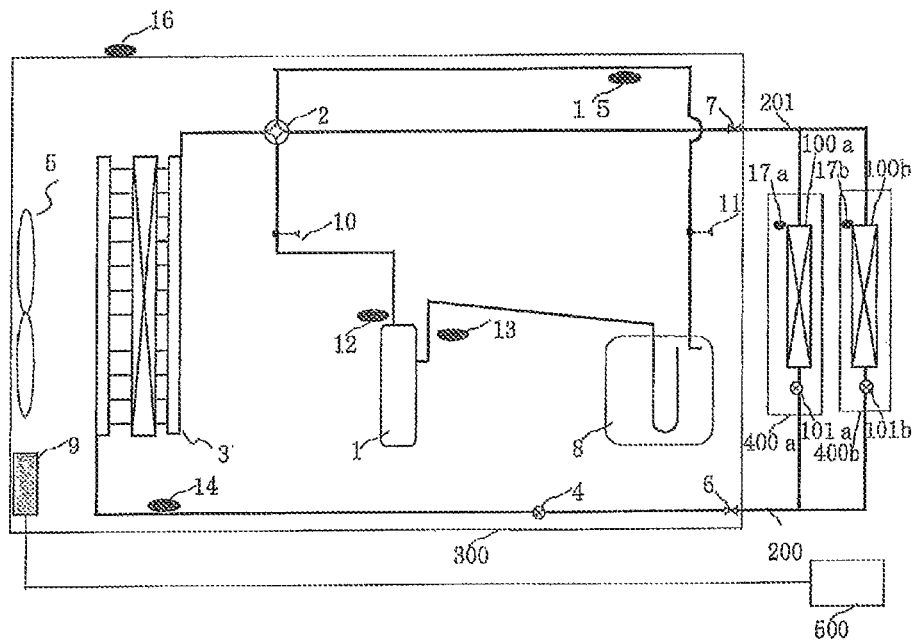
FIG. 1 is a diagram illustrating an exemplary configuration of an air-conditioning apparatus according to Embodiment 1 of the present invention.

FIG. 1 is a diagram illustrating an exemplary configuration of an air-conditioning apparatus according to Embodiment 1 of the present invention. The air-conditioning apparatus according to Embodiment 1 is configured to set a first target set temperature and a second target set temperature, and ensure a stable operation state based on the target set temperatures, without impairing the quality.

As illustrated in FIG. 1, the air-conditioning apparatus according to Embodiment 1 includes an outdoor unit 300, an indoor unit 400 including indoor units 400a and 400b, a liquid-side refrigerant pipe 200, and a gas-side refrigerant pipe 201. The outdoor unit 300 includes, as its components, a compressor 1, a four-way valve 2, an outdoor heat exchanger 3, an outdoor flow control valve 4, an outdoor fan 5, a liquid-side opening/closing valve 6, a gas-side opening/closing valve 7, an accumulator 8, and a controller 9. The indoor unit 400 including indoor units 400a and 400b includes, as its components, an indoor heat exchanger 100 including indoor heat exchangers 100a and 100b, and an indoor flow control valve 101 including indoor flow control valves 101a and 101b. The liquid-side refrigerant pipe 200 and the gas-side refrigerant pipe 201 connect the outdoor unit 300 and the indoor unit 400 to each other. By circulating a refrigerant through the refrigerant circuit via the connected refrigerant pipes, a cooling operation, a heating operation, and a defrosting operation can be performed. Furthermore, the operation capacity of the compressor 1 can be variably controlled according to loads, and the amount of refrigerant circulated, which flows into the indoor units 400 including the indoor units 400a and 400b, can be controlled by the indoor flow control valves 101 including the indoor flow control valves 101a and 101b. When a distinction between the indoor units 400a and 400b is not made, an explanation will be provided hereinafter without suffixes. The same applies to the devices provided in the indoor units 400.

The outdoor flow control valve 4 is provided between the outdoor heat exchanger 3 and the liquid-side opening/closing valve 6, and is configured to appropriately control the amount of refrigerant flowing into the outdoor unit 300 during a heating operation and control the flow rate to accumulate the refrigerant in the liquid-side refrigerant pipe 200 so that the amount of excess refrigerant falls below the maximum allowable amount of refrigerant that can be accumulated in the accumulator 8. The controller 9 controls the refrigerant circuit, based on two first target set temperatures (to be simply referred to as target set temperatures hereinafter) T1 and T2 set by, for example, instruction input means 500 of a remote controller or the like, so that the air temperature (room temperature) of an air-conditioned space (indoor space) falls within the range between the target temperatures T1 and T2. The controller 9 includes a time measuring means such as a timer and is able to measure the operation time and the like.

In order to control driving of individual actuators (for example, the compressor 1, the four-way valve 2, the outdoor flow control valve 4, and the outdoor fan 5) provided in the outdoor unit, the outdoor unit 300 includes a first pressure sensor 10, a second pressure sensor 11, a first temperature sensor 12, a second temperature sensor 13, a third temperature sensor 14, a fourth temperature sensor 15, a fifth temperature sensor 16, and a sixth temperature sensor 17.

The first pressure sensor 10 is provided between the compressor 1 and the four-way valve 2 and is configured to detect the pressure (high-side pressure) of a refrigerant discharged from the compressor 1. The second pressure sensor 11 is provided upstream of the accumulator 8 and is configured to detect the pressure (low-side pressure) of a refrigerant drawn into the compressor 1 by suction. The first temperature sensor 12 is provided between the compressor 1 and the four-way valve 2 and is configured to detect the temperature (discharge temperature) of a refrigerant discharged from the compressor 1. The second temperature sensor 13 is provided between the accumulator 8 and the compressor 1 and is configured to detect the temperature (suction temperature) of a refrigerant drawn into the compressor 1 by suction. The third temperature sensor 14 is provided between the outdoor heat exchanger 3 and the outdoor flow control valve 4 and is configured to detect the temperature of a refrigerant passing through the passage between the outdoor heat exchanger 3 and the outdoor flow control valve 4. The fourth temperature sensor 15 is provided between the outdoor heat exchanger 3 and the accumulator 8 and is configured to detect the temperature of a refrigerant passing through the passage between the outdoor heat exchanger 3 and the accumulator 8. The fifth temperature sensor 16 is configured to detect the temperature in the vicinity of the outdoor unit. The sixth temperature sensor 17 including sixth temperature sensors 17a and 17b is configured to detect the temperature (equal to room temperature) of air flowing into the indoor heat exchanger 100 including the indoor heat exchangers 100a and 100b.

Figure 2:
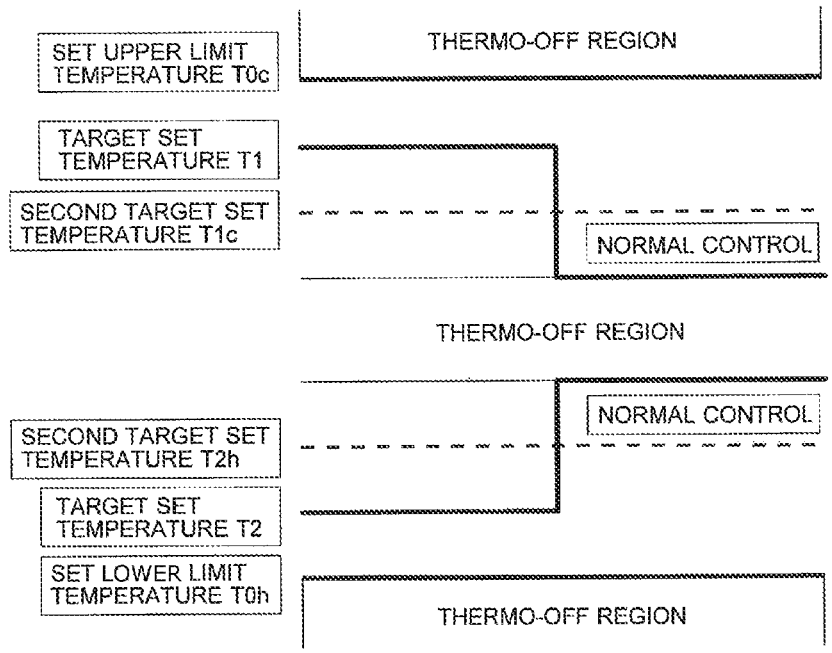
FIG. 2 is a diagram illustrating the relationship of temperatures set in the air-conditioning apparatus according to Embodiment 1.

FIG. 2 is a diagram illustrating the relationship of temperatures set in the air-conditioning apparatus according to Embodiment 1. Referring to FIG. 2, the target set temperatures T1 and T2 may be set arbitrarily by the user via the instruction input means 500. The air-conditioning apparatus according to Embodiment 1 switches from a heating operation to a cooling operation and performs operation when, for example, the room temperature becomes higher than the target set temperature T1. In contrast, when the room temperature becomes lower than the target set temperature T2, the air-conditioning apparatus performs switching from a cooling operation to a heating operation and performs operation. By setting the two target set temperatures and switching the operation mode, hunting expected to occur before and after switching between a cooling operation and a heating operation can be prevented, and stable air-conditioning can thus be performed. It is assumed that during the operation, the controller 9 is able to freely change the target set temperatures T1 and T2 from a temperature set by the user, according to the environment of an air-conditioned space and the like, within a predetermined limit. A set upper limit temperature T0c means a temperature defining the upper limit beyond which it is no longer possible to set the target set temperatures T1 and T2 and the like, due to factors associated with, for example, the air-conditioning capacity. In contrast, a set lower limit temperature T0h means a temperature defining the lower limit within which the target set temperatures T1 and T2 and the like can be set. Second target set temperatures T1c and T2h are set in order to protect constituent devices of the air-conditioning apparatus, such as the compressor 1 and electrical parts (ensure an expected product life). The second target set temperature T1c is set to a comparatively high temperature (on the side of the set upper limit temperature) in correspondence with the set upper limit temperature T0c. The second target set temperature T2h is set to a comparatively low temperature (on the side of the set lower limit temperature) in correspondence with the set lower limit temperature T0h. For example, before the operation, the second target set temperatures T1c and T2h can be changed (switched), for example, by a switch provided in the controller 9, by changing control software installed in the controller 9, or the like.

Figure 3:
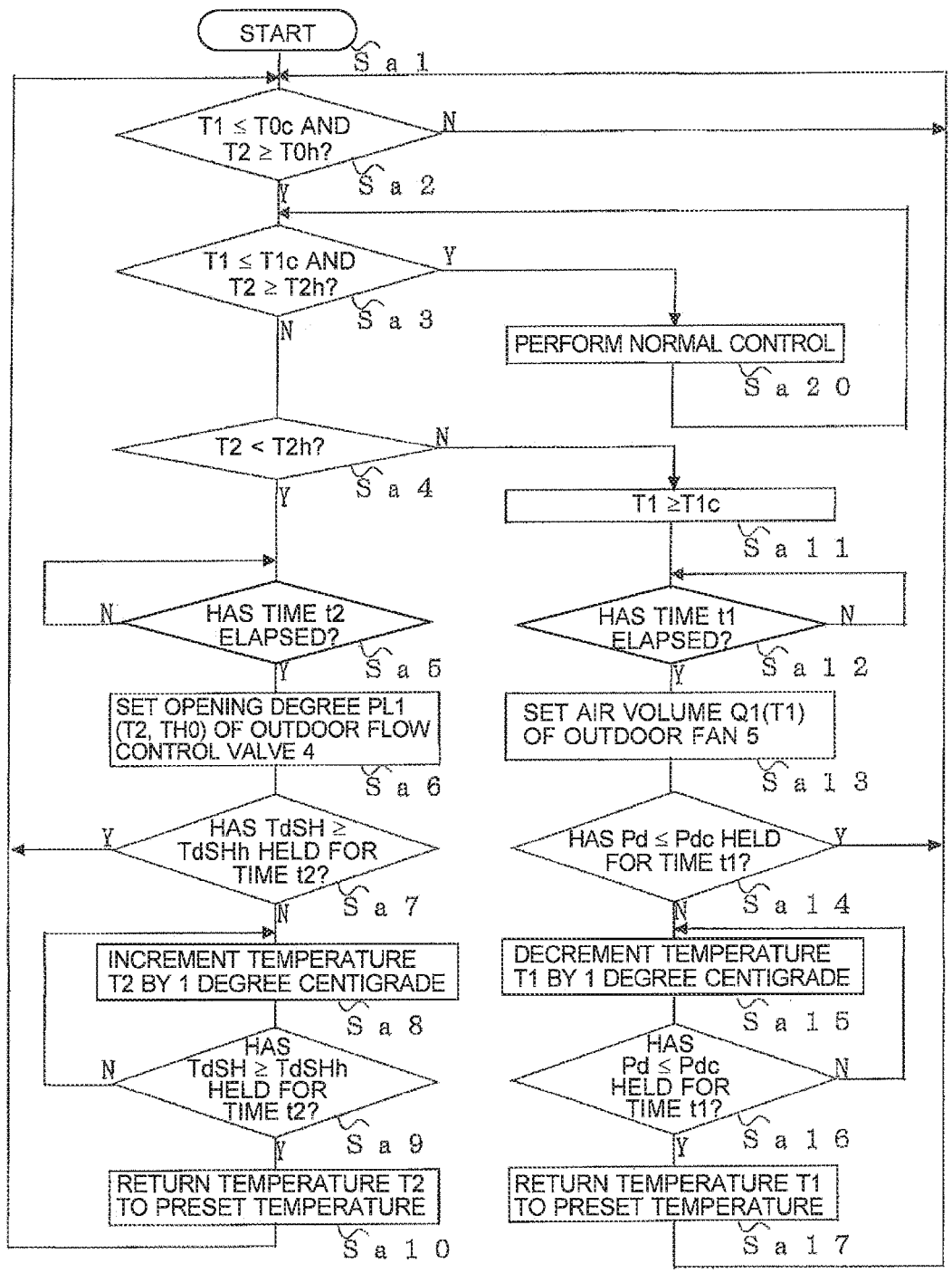
FIG. 3 is a flowchart illustrating a control process by a controller 9 in the air-conditioning apparatus according to Embodiment 1 of the present invention.

FIG. 3 is a flowchart illustrating a control process by the controller 9 in the air-conditioning apparatus according to Embodiment 1 of the present invention. The sequence of the control process by the controller 9, which is a feature of Embodiment 1, will be explained in detail with reference to FIG. 3. First, when an operation instruction is transmitted to the controller 9, the operation of the air-conditioning apparatus is started (step Sa1). At this time, for example, the target set temperatures T1 and T2 are set by the user. Regarding the set target set temperatures T1 and T2, it is determined whether the target set temperature T1 is equal to or lower than the set upper limit temperature T0c, and the target set temperature T2 is equal to or higher than the set lower limit temperature T0h (step Sa2). When it is determined that the target set temperature T1 is higher than the set upper limit temperature T0c or the target set temperature T2 is lower than the set lower limit temperature T0h, for example, the operation is stopped. Information indicating that setting cannot be performed may be displayed on display means (not illustrated), and setting of the target set temperatures T1 and T2 may be inhibited until given conditions are met.

When the target set temperature T1 is equal to or lower than the set upper limit temperature T0c and the target set temperature T2 is equal to or higher than the set lower limit temperature T0h, it is further determined whether the target set temperature T1 is equal to or lower than the second target set temperature T1c, and the target set temperature T2 is equal to or higher than the second target set temperature T2h (step Sa3). When it is determined that the target set temperature T1 is equal to or lower than the second target set temperature T1c and the target set temperature T2 is equal to or higher than the second target set temperature T2h, normal control is performed (step Sa20).

For example, when the target set temperatures T1 and T2 are set close to the set upper limit temperature T0c and the set lower limit temperature T0h, due to their closeness to the boundary of the unit operation range, it may take a considerable time to make a shift from normal operation to a stable operation state. Thus, by setting an optimal actuator control value in accordance with the target set temperatures T1 and T2, the room temperature can be stabilized in a short period of time.

When it is determined in step Sa3 that the target set temperature T1 is higher than the second target set temperature T1c or the target set temperature T2 is lower than the second target set temperature T2h, it is determined whether the target set temperature T2 is lower than the second target set temperature T2h (step Sa4).

When it is determined that the target set temperature T2 is lower than the second target set temperature T2h, it is determined whether the condition in which the target set temperature T2 is lower than the second target set temperature T2h has held for a time t2 (step Sa5). For example, when the target set temperature T2 is low (the room temperature decreases), the low-side pressure detected by the second pressure sensor 11 decreases as the high-side pressure detected by the first pressure sensor 10 decreases. Therefore, the amount of refrigerant required, circulating through the refrigerant circuit, decreases, and the amount of excess refrigerant increases. At this time, if the accumulator 8 cannot secure a capacity enough to store an excess refrigerant, a liquid refrigerant overflows from the accumulator 8, which may result in damage to the compressor 1.

By changing the actuator control value for the air-conditioning apparatus according to the target set temperature T2, overflow of a refrigerant can be prevented. For example, when the target set temperature T2 is low, the amount of liquid returned at the time of starting the compressor 1 increases, and the amount of excess refrigerant may increase. Therefore, in order to adjust, for example, the amount of refrigerant flowing into the outdoor unit 300 in accordance with the target set temperature T2, the opening degree PL1(T2) of the outdoor flow control valve, for example, is changed to close the outdoor flow control valve 4 (step Sa6). When the target set temperature T2 is high, the opening degree PL1(T2) of the outdoor flow control valve is changed to open the outdoor flow control valve 4.

Further, regarding the opening degree PL1(T2) of the outdoor flow control valve 4, the outdoor flow control valve opening degree PL1(T2, TH0) is set based on the temperature TH0 around the outdoor unit 300 detected by the fifth temperature sensor 16. For example, when the temperature TH0 is low, the low-side pressure detected by the second pressure sensor 11 decreases, the amount of refrigerant required in the refrigerant circuit decreases, and the amount of excess refrigerant increases. Therefore, by setting the opening degree PL1(T2, TH0) of the outdoor flow control valve 4 to close the outdoor flow control valve 4, the amount of liquid returned to the accumulator 8 at the time of starting the compressor 1 decreases, thereby suppressing an increase in amount of the excess refrigerant.

Note that similar effects can be achieved by changing the driving frequency of the compressor 1, instead of changing the opening degree of the outdoor flow control valve 4 or in addition to changing the opening degree of the outdoor flow control valve 4. For example, when the target set temperature T2 is low, the amount of liquid returned at the time of starting the compressor 1 increases. Therefore, when the target set temperature T2 is low, the amount of refrigerant circulated can be reduced by decreasing the driving frequency of the compressor 1, thereby reducing the amount of liquid returned.

The discharge degree of superheat (to be referred to as the discharge degree of superheat TdSH hereinafter) is calculated based on the high-side pressure detected by the first pressure sensor 10 and the temperature detected by the first temperature sensor 12. Then, it is determined whether the condition in which the discharge degree of superheat TdSH is equal to or higher than a reference value TdSHh has held for a time t2 (step Sa7). When it is determined that the condition in which the discharge degree of superheat TdSH is equal to or higher than the reference value TdSHh has held for the time t2, this means that the amount of excess refrigerant in the accumulator 8 is appropriate. Then, the process returns to step Sa2, in which the process continues.

In contrast, when it is determined in step Sa7 that the condition in which the discharge degree of superheat TdSH is equal to or higher than the reference value TdSHh has not held for the time t2, this means that the amount of excess refrigerant is inappropriate (an excessive amount of refrigerant is accumulated in the accumulator 8). Thus, it is difficult to achieve appropriate control only by the outdoor flow control valve 4, and the air-conditioning environment is changed. For example, the target set temperature T2 is incremented by 1 degree Centigrade (step Sa8). By setting the target set temperature T2 high, the low-side pressure is expected to increase as the high-side pressure increases. Therefore, the amount of refrigerant required, circulating in the refrigerant circuit, increases, and the amount of excess refrigerant in the accumulator 8 can thus be reduced.

After the target set temperature T2 is incremented by 1 degree Centigrade in step Sa8, it is again determined whether the condition in which the discharge degree of superheat TdSH is equal to or higher than the reference value TdSHh has held for the time t2 (step Sa9) to, in turn, determine whether the amount of excess refrigerant in the accumulator 8 is appropriate. When it is determined that the condition in which the discharge degree of superheat TdSH is equal to or higher than the reference value TdSHh has not held for the time t2, the process returns to step Sa8, in which the target set temperature T2 is further incremented by 1 degree Centigrade. This processing is repeated and ends when the condition in which the discharge degree of superheat TdSH is equal to or higher than the reference value TdSHh has held for the time t2.

If it is determined, based on the determination result obtained in step Sa9, that the amount of excess refrigerant in the accumulator 8 is appropriate, the target set temperature T2 is returned to the preset temperature (step Sa10). Then, the process returns to step Sa2, in which the operation continues.

In contrast, when it is determined in step Sa4 that the target set temperature T2 is equal to or higher than the second target set temperature T2h, the target set temperature T1 is higher than the second target set temperature T1c (step Sa11). Processing for the case where the target set temperature T1 is higher than the second target set temperature T1c will be explained below. First, it is determined whether the condition in which the target set temperature T1 is higher than the second target set temperature T1c has held for a time t1 (step Sa12). For example, when the target set temperature T1 is high (the room temperature increases), the low-side pressure detected by the second pressure sensor 11 increases, and the high-side pressure detected by the first pressure sensor 10 also increases. At this time, for example, when a preset control target value for the high-side pressure is reached, and the compressor frequency or the like is reduced to keep the target value (upper limit value), the amount of refrigerant circulated may be reduced, and the heat exchange capacity may thus be reduced. In addition, by operation for a long time in the condition in which the high-side pressure is kept at the target value (upper limit value), the load imposed on an electrical part or the like may increase, thus shortening the product life.

By changing the actuator control value for the air-conditioning apparatus according to the target set temperature T1, a reduction in heat exchange capacity, shortening of the product life, and the like can be prevented. For example, in order to reduce the high-side pressure, control is done so that the air volume of the outdoor fan 5 increases to a value corresponding to the target set temperature T1 (step Sa13). Then, it is determined whether the heat exchange capacity of the outdoor unit 300 has changed and the high-side pressure has been appropriately controlled.

Note that similar effects can be achieved by changing the driving frequency of the compressor 1 within a range which does not affect the heat exchange capacity, instead of changing the air volume of the outdoor fan 5 or in addition to changing the air volume of the outdoor fan 5. For example, when the target set temperature T1 increases, the high-side pressure increases. Therefore, when the target set temperature T1 increases, an increase in high-side pressure is suppressed by reducing the driving frequency of the compressor 1, thereby reducing the load imposed on an electrical part or the like.

Then, it is determined whether, for example, the condition in which a high-side pressure Pd detected by the first pressure sensor 10 is equal to or lower than a reference high-side pressure Pdc has held for the time t1 (step Sa14). When it is determined that the condition in which the high-side pressure Pd is equal to or lower than the reference high-side pressure Pdc has held for the time t1, this means that the load can be suppressed to ensure the product life of an electrical part. Then, the process returns to step Sa2 and continues.

In contrast, when it is determined in step Sa14 that the high-side pressure Pd is higher than the reference high-side pressure Pdc, this means that it is difficult to perform the aforementioned control process by controlling only the air volume Q1(T1) of the outdoor fan 5, and the air-conditioning environment is changed. For example, the target set temperature T1 is further decremented by, for example, 1 degree Centigrade (step Sa15). By setting the target set temperature T1 low, the high-side pressure is expected to reduce.

After the target set temperature T1 is decremented by 1 degree Centigrade in step Sa15, it is again determined whether the condition in which the high-side pressure Pd is equal to or lower than the high-side pressure Pdc has held for the time t1 to, in turn, determine whether the product life of an electrical part can be ensured (step Sa16). When it is determined that the condition in which the high-side pressure Pd is equal to or lower than the high-side pressure Pdc has not held for the time t1, the process returns to step Sa15, in which the target set temperature T1 is further decremented by 1 degree Centigrade. This processing is repeated and ends when the condition in which the high-side pressure Pd is equal to or lower than the high-side pressure Pdc has held for the time t1.

When it is determined in step Sa16 that the high-side pressure Pd is equal to or lower than the reference high-side pressure Pdc, the target set temperature T1 is returned to the preset temperature (step Sa17). Then, the process proceeds to step Sa2, in which the operation continues.

As described above, with the air-conditioning apparatus according to Embodiment 1, even in an operation when the target set temperatures T1 and T2 are set close to the set upper limit temperature T0c and the set lower limit temperature T0h, stable air-conditioning can be achieved.

Furthermore, the set second target set temperatures can be changed by a switch provided in the controller 9 or by changing control software installed in the controller. Therefore, the second target set temperatures can be set in accordance with the arrangement of the pipe system of the air-conditioning system, the ambient temperature environment, and the like. For example, when the pipe system uses long pipes, the amount of refrigerant charged is large, and the amount of excess refrigerant is also large. Thus, by increasing the second target set temperature T2h, the amount of excess refrigerant in the accumulator 8 can be kept small. Further, when the outdoor suction temperature is always high and a high-load operation continues, the load imposed on an electrical part is excessive. Therefore, by decreasing the second target set temperature T1c, the load imposed on an electrical part can be reduced with a decrease in high-side pressure detected by the first pressure sensor 10.

Embodiment 2

For example, when a target set temperature T3 set during a heating operation is low, the indoor unit 400 may frequently repeat thermo-ON and thermo-OFF. At this time, by entering the thermo-OFF state before the excess refrigerant in the accumulator 8 evaporates, the amount of liquid returning into the compressor 1 increases, which may cause damage to the compressor 1. Thus, an air-conditioning apparatus according to Embodiment 2 performs control for reducing changes between thermo-ON and thermo-OFF states. Note that the configuration of the air-conditioning apparatus according to Embodiment 2 is similar to the configuration of the air-conditioning apparatus according to Embodiment 1 described above.

Figure 4:
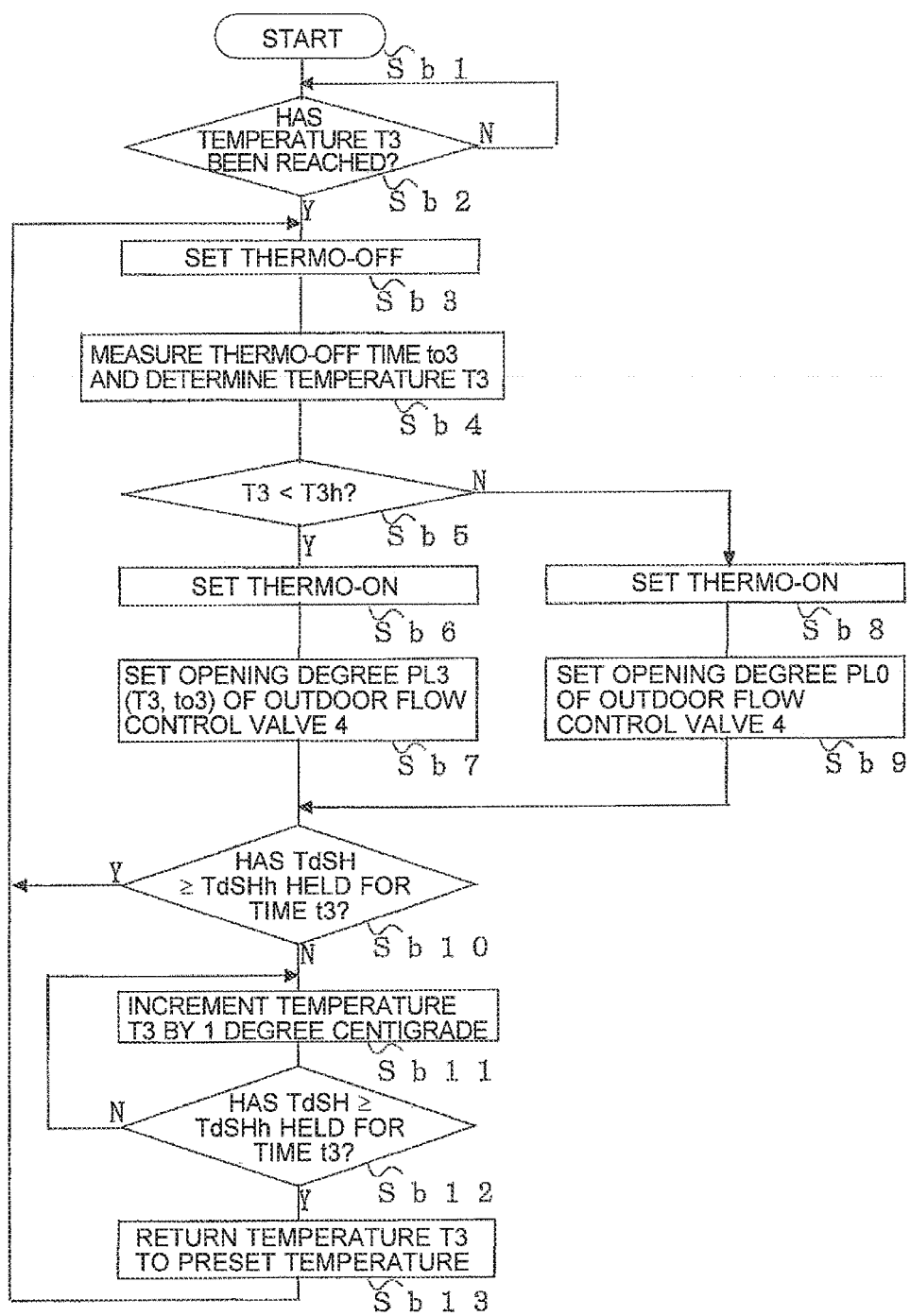
FIG. 4 is a flowchart of a process by the controller 9 according to Embodiment 2 of the present invention.

FIG. 4 is a flowchart of a process by the controller 9 according to Embodiment 2 of the present invention. The sequence of the control process, which is a feature of Embodiment 2, will be explained in detail with reference to FIG. 4. First, when an operation instruction is transmitted to the controller 9, the operation of the air-conditioning apparatus is started (step Sb1). At this time, the target set temperature T3 is set by the user.

Then, it is determined whether the target set temperature T3 has been reached by execution of a cooling operation for cooling a room (step Sb2). When it is determined that the target set temperature T3 has been reached, the indoor unit 400 is stopped (thermo-OFF) (step Sb3). Then, measurement of a time to3, which is a thermo-OFF time, is performed by time measuring, and a determination of the target set temperature T3 is performed (step Sb4).

For example, when the target set temperature T3 is set close to the set lower limit temperature T0h, due to the proximity to the boundary of a unit operation range, it may take a certain time to make a shift from normal operation to a stable operation state. Thus, by setting an optimal actuator control value according to the target set temperature T3 and the thermo-OFF time to3, the room temperature can be stabilized in a short period of time.

Thus, it is determined whether the target set temperature T3 is lower than a second target set temperature T3h (step Sb5). When it is determined that the target set temperature T3 is equal to or higher than the second target set temperature T3h, after the room temperature reaches the target set temperature T3 and the thermo-ON state is entered (step Sb8), normal control is performed. Then, the opening degree of the outdoor flow control valve 4 is set to a predetermined opening degree PL0 (step Sb9).

In contrast, when it is determined that the target set temperature T3 is lower than the second target set temperature T3h, after the thermo-ON state is entered (step Sb6), for example, the opening degree of the outdoor flow control valve 4 is set to an opening degree PL3(T3, to3), based on the target set temperature T3 and the thermo-OFF time to3 (step Sb7). When the target set temperature T3 is lower than the second target set temperature T3h, since the target set temperature T3 is close to the set lower limit temperature T0h, there is a possibility that the excess refrigerant in the accumulator 8 is kept accumulated without evaporating and the excess refrigerant in the accumulator 8 is further increased, as described above. At the opening degree PL0 of the outdoor flow control valve 4, which is similar to normal control, an excessive liquid refrigerant may flow into the accumulator 8. Therefore, it is necessary to adjust and reduce the inflow of the liquid refrigerant to an amount of excess refrigerant that may be accepted by the accumulator 8. Since the amount of excess refrigerant in the accumulator 8 increases as the target set temperature T3 decreases, the opening degree PL3 of the outdoor flow control valve 4 is changed toward a closing direction to correct the amount of liquid returning to the accumulator 8 and thus suppresses an increase in amount of excess refrigerant.

When the thermo-OFF time to3 extends, in particular, at a low outside air temperature, the amount of liquid refrigerant in the accumulator 8 may increase during the thermo-OFF time. Therefore, the outside air temperature detected by the fifth temperature sensor 16 may also be used as a control parameter. For example, as the outside air temperature decreases, the opening degree of the outdoor flow control valve 4 is changed to close the outdoor flow control valve 4. Accordingly, the amount of liquid returning to the accumulator 8 may be corrected at the thermo-ON time or the like, so that an increase in amount of excess refrigerant may be suppressed.

The discharge degree of superheat TdSH is calculated based on the high-side pressure detected by the first pressure sensor 10 and the temperature detected by the first temperature sensor 12. Then, when it is determined that the condition in which the discharge degree of superheat TdSH is equal to or higher than the reference value TdSHh has held for a time t3, this means that the amount of excess refrigerant in the accumulator 8 is appropriate. Then, the process returns to step Sb3 and continues (step Sb10).

When it is determined in step Sb10 that the amount of excess refrigerant is not appropriate (excessive refrigerant is accumulated in the accumulator 8), this means that it is difficult to achieve control only by the outdoor flow control valve 4, the air-conditioning environment is changed accordingly. For example, the target set temperature T3 is incremented by 1 degree Centigrade (step Sb11). By setting the target set temperature T3 high, an effect can be expected in which the low-side pressure increases as the high-side pressure increases. Therefore, the amount of refrigerant required, circulating in the refrigerant circuit, increases, and the amount of excess refrigerant in the accumulator 8 may thus be reduced.

After the target set temperature T3 is incremented by 1 degree Centigrade in step Sb11, it is again determined whether the condition in which the discharge degree of superheat TdSH is equal to or higher than the reference value TdSHh has held for the time t3 to, in turn, determine whether the amount of excess refrigerant in the accumulator 8 is appropriate (step Sb12). When it is determined that the condition in which the discharge degree of superheat TdSH is equal to or higher than the reference value TdSHh has not held for the time t3, the process returns to step Sb11, in which the target set temperature T3 is further incremented by 1 degree Centigrade. This processing is repeated and ends when the condition in which the discharge degree of superheat TdSH is equal to or higher than the reference value TdSHh has held for the time t3.

When it is determined in step Sb10 that the amount of excess refrigerant in the accumulator 8 is appropriate, the target set temperature T3 is returned to the temperature set in advance by the user (step Sb13). Then, the process proceeds to step Sb3, in which the operation continues.

In the processing of step Sb6 and then step Sb7, after the determination of step Sb10 is performed, it may be determined whether there is a need to change the opening degree of the outdoor flow control valve 4 to a control value corresponding to the target set temperature T3 and the thermo-OFF time to3.

As described above, with the air-conditioning apparatus according to Embodiment 2, by execution of the process with the controller 9, even under a condition in which thermo-ON and thermo-OFF are frequently performed in an operation in which a target set temperature is set close to the set lower limit temperature T0h, the amount of excess refrigerant in the accumulator 8 can be corrected appropriately, and a stable control can be achieved in a short period of time.

Embodiment 3

For example, in execution of a heating operation, when the temperature set as a target set temperature T4 is low, the indoor unit 400 may frequently repeat thermo-ON and thermo-OFF in a short period of time. At this time, for example, if the indoor unit 400 stops before the outdoor heat exchanger 3 performs a defrosting operation to remove deposited frost, the state where a defrosting operation is unavailable continues, and there is a possibility where a frost remaining state is kept and the heating capacity is thus significantly decreased. Thus, an air-conditioning apparatus according to Embodiment 3 is configured to perform a defrosting operation. The configuration of the air-conditioning apparatus according to Embodiment 3 is similar to the configuration of the air-conditioning apparatus according to Embodiment 1 described above.

Figure 5:
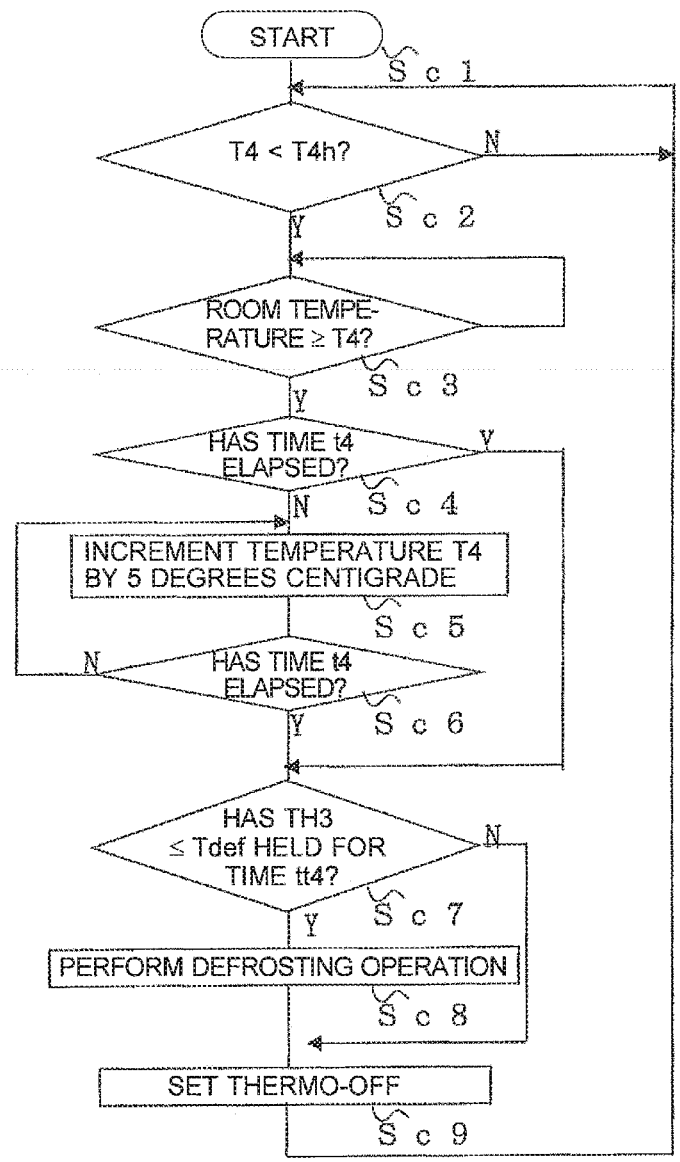
FIG. 5 is a flowchart of a process by the controller 9 according to Embodiment 3 of the present invention.

FIG. 5 is a flowchart of a process by the controller 9 according to Embodiment 3 of the present invention. The sequence of the control process, which is a feature of Embodiment 3, will be explained in detail with reference to FIG. 5. First, when an operation instruction is transmitted to the controller 9, the operation of the air-conditioning apparatus is started (step Sc1). At this time, the target set temperature T4 is set by the user.

When the target set temperature T4 is set close to the set lower limit temperature T0h in each room (each indoor unit 400), due to the proximity to the boundary of a unit operation range, the evaporating temperature of the outdoor heat exchanger 3 decreases, and an environment which accelerates frost formation in the outdoor heat exchanger 3 is brought about. As described above, frequent repetitions of thermo-OFF in a short period of time in the indoor unit 400 disable a defrosting operation, and the state where frost remains on the outdoor heat exchanger 3 is thus kept.

It is determined whether the target set temperature T4 is lower than a control change temperature T4h (step Sc2). Note that the control change temperature T4h is a reference temperature for determining whether a defrosting operation is to be enabled through normal processing or through processing different from the normal processing. When it is determined that the target set temperature T4 is equal to or higher than the control change temperature T4h, normal control is performed, and a determination as to whether to perform a defrosting operation is performed in the normal control.

In contrast, when it is determined that the target set temperature T4 is lower than the control change temperature T4h, it is determined whether the target set temperature T4 is equal to or lower than the room temperature (suction temperature) detected by the sixth temperature sensor 17 (step Sc3). Then, when it is determined that the target set temperature T4 is equal to or lower than the room temperature, it is further determined whether a time t4, during which a defrosting operation is performed, has elapsed after the last defrosting operation (step Sc4).

When it is determined in step Sc4 that the time t4 has not elapsed, there is a need to continue, before performing a determination as to the frost remaining state of the outdoor heat exchanger 3, the operation for the time t4 or more, during which a defrosting operation can be performed. Therefore, the target set temperature T4 is further incremented by, for example, 5 degrees Centigrade (step Sc5). Then, the heating operation continues until the time t4 elapses (step Sc6). When the time t4 has not elapsed, the target set temperature T4 is changed again, and the processing is repeated until the time t4 elapses.

After the time t4, during which a defrosting operation can be performed, has elapsed, there is a need to determine whether frost has been deposited on the outdoor heat exchanger 3. For example, it is determined whether the condition in which a temperature TH3 detected by the third temperature sensor 14 mounted at the inlet of the outdoor heat exchanger 3 is equal to or lower than a reference temperature Tdef has held for a time tt4 (step Sc7). When it is determined that the condition in which the temperature TH3 detected by the third temperature sensor 14 is equal to or lower than the reference temperature Tdef has held for the time tt4, this means that frost has been deposited on the outdoor heat exchanger 3, and a defrosting operation is performed (step Sc8). When it is determined that the state has not held for the time tt4, a heating operation continues without a defrosting operation, and the thermo-OFF state is entered (step Sc9).

As described above, after the thermo-OFF condition is met in step Sc3, a determination as to whether to perform a defrosting operation is performed. Then, the thermo-OFF state is entered. Accordingly, it is possible to avoid frost remaining at the thermo-OFF time, which is caused by the state where the room temperature reaches T4 in a short period of time and frequently when the target set temperature T4 is low. Therefore, the operation can continue without reducing the heating capacity.

Embodiment 4

An air-conditioning apparatus according to Embodiment 4 is configured to change an actuator control value for the air-conditioning apparatus, regarding set target set temperatures TA1 and TA2, in accordance with the temperature difference $\Delta T = TA1 - TA2$ in consideration of energy conservation. Accordingly, the number of changes between cooling and heating operations can be reduced, and a stable room temperature can be maintained.

In general, when the temperature difference $\Delta T$ between the target set temperatures is large, a temperature region (time) in the thermo-OFF state increases. Therefore, the power consumption decreases, and the energy conservation is improved. In contrast, when the temperature difference $\Delta T$ is small, a temperature region (time) in the thermo-ON state increases. Therefore, the power consumption increases, and the energy conservation is degraded. Further, when the temperature difference $\Delta T$ is small, the number of changes between cooling and heating operations increases. When the number of times of start increases, in order to cause the room temperature which is increased or decreased at the thermo-OFF time to reach the target set temperature TA1 or the target set temperature TA2, the power consumption at the starting time occurs. For example, by changing the driving frequency (speed) of the compressor 1 during a period from starting of the compressor 1 to a time at which the room temperature reaches the target set temperature TA1 or the target set temperature TA2, in accordance with the temperature difference $\Delta T$, the start-stop frequency of the compressor 1 may be reduced, which reduces the power consumption at the starting time.

Figure 6:
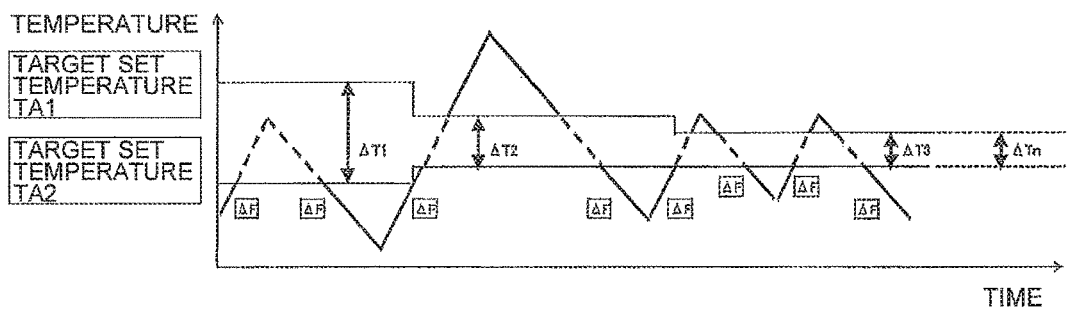
FIG. 6 is a diagram illustrating an example of variations in room temperature with time.

FIG. 6 is a diagram illustrating an example of variations in room temperature with time. For example, it is assumed that the temperature difference varies in the order of $\Delta T1$, $\Delta T2$, $\Delta T3$, ..., and $\Delta Tn$, as illustrated in FIG. 6. When the compressor 1 is driven at a constant driving frequency from the starting of the compressor 1, without depending on the temperature difference $\Delta T$, the smaller the temperature difference $\Delta T$, the shorter the time required to reach a target set temperature. Thus, the start-stop frequency increases, and not only does the power consumption increase, but also the room temperature is not stable. When the temperature difference $\Delta T$ between the target set temperatures is small, the thermo-OFF region is small. Therefore, overshoot (or undershoot) after reaching a target set temperature increases. Thus, when variations in temperature are recognized in time sequence, the user is expected to feel uncomfortable.

Figure 7:
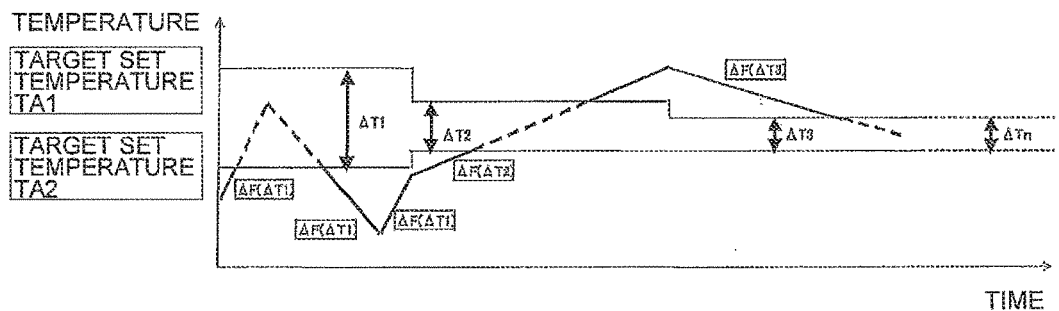
FIG. 7 is a diagram illustrating an example of variations in room temperature with time in Embodiment 4 of the present invention.

FIG. 7 is a diagram illustrating an example of variations in room temperature with time in Embodiment 4 of the present invention. In Embodiment 4, as illustrated in FIG. 7, for example, the driving frequency of the compressor 1 is caused to vary in accordance with variations in temperature difference in the order of $\Delta T1$, $\Delta T2$, $\Delta T3$, ..., and $\Delta Tn$, as below. The size of the temperature difference $\Delta T$ is in proportional to a range (variation range) in which the driving frequency varies. Thus, when the speed of the compressor 1 is changed by changing the driving frequency, the larger the temperature difference $\Delta T$, the larger the variation range of the driving frequency.

Temperature Difference $\Delta T$=Target Set Temperature $TA1$ (Cooling)−Target Set Temperature $TA2$ (Heating)

Driving Frequency $Fp$ When Speed of Compressor 1 is Increased=Current Frequency $F$+Frequency Variation Range $\Delta F(\Delta T)$ Driving Frequency $Fm$ When Speed of Compressor 1 is Decreased=Current Frequency $F$−Frequency Variation Range $\Delta F(\Delta T)$ Frequency Variation Range $\Delta F(\Delta T)$=Current Frequency $F$×Temperature Difference $\Delta T$/Correction Coefficient $\alpha$ When the temperature difference $\Delta T$ is small, the driving frequency is changed to keep the rate of change in speed of the compressor 1 low. The time required to reach a target set temperature is slightly prolonged. When variations in temperature are recognized in time sequence, however, the start-stop frequency of the compressor 1 can be reduced. Therefore, relatively stable temperature control can be achieved. Further, the number of times of start can be reduced. The amount of increase in power consumption caused by rapidly increasing the driving frequency at the starting time or the like, can be reduced, thereby improving energy conservation.

Figure 8:
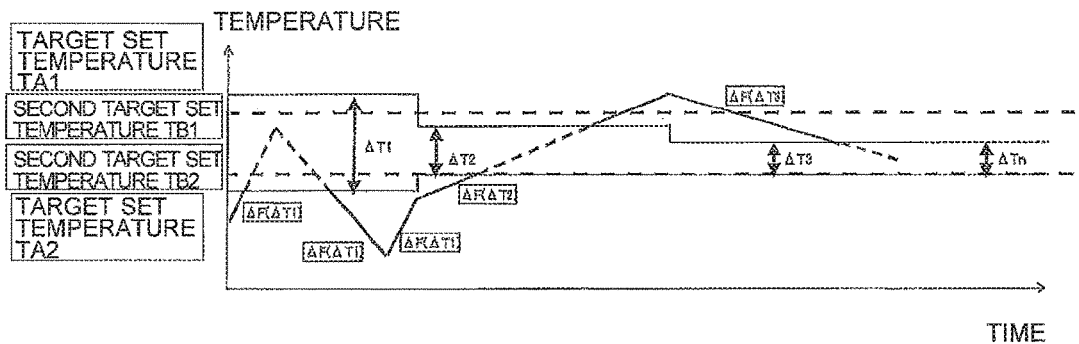
FIG. 8 is a diagram illustrating an example of variations in room temperature with time in Embodiment 4 of the present invention.

FIG. 8 is a diagram illustrating an example of variations in room temperature with time in Embodiment 4 of the present invention. For example, at least one of the target set temperature TA1 and the target set temperature TA2 may be equal to or higher than a second target set temperature TB1 or equal to or lower than a second target set temperature TB2. In accordance with the relationship with the second target set temperature TB1 or the second target set temperature TB2, the temperature difference $\Delta T$ may be reset in the following way to change the driving frequency of the compressor 1.

1. When TA1>TB1 and TA2<TB2, $\Delta T$=TB1−TB2
2. When TA1≤TB1 and TA2<TB2, $\Delta T$=TA1−TB2
3. When TA1>TB1 and TA2≥TB2 $\Delta T$=TB1−TA2
4. When TA1≤TB1 and TA2≥TB2 $\Delta T$=TA1−TA2

As described above, by changing the rate of change in speed of the compressor 1 in accordance with the relationship between the target set temperatures TA1 and TA2 and the second target set temperatures TB1 and TB2, for example, when the target set temperatures TA1 and TA2 are set higher than the second target set temperatures TB1 and TB2, $\Delta T$ is smaller than the temperature range illustrated in FIG. 7 and, therefore, the driving frequency is low.

For example, by correcting, to a greater extent than the control illustrated in FIG. 7, the state where an overshoot of the indoor unit suction temperature occurs and the indoor unit suction temperature becomes higher than the second target set temperature TB1, which is the upper limit value, the load imposed on an electrical part in a cooling operation can be reduced. Further, by correcting, to a greater extent than the control illustrated in FIG. 7, the state where an undershoot of the indoor suction temperature occurs and the indoor unit suction temperature becomes lower than the second target set temperature TB2, which is the lower limit value, the state where a larger amount of liquid refrigerant flows into the accumulator 8 as the indoor unit suction temperature decreases in a heating operation can be corrected, thereby the amount of liquid refrigerant being reduced to an amount of excess refrigerant that may be accepted by the accumulator 8.

Embodiment 5

For example, when a target set temperature T5, which is set during a cooling operation, is high, if the high-side pressure is kept close to a target value (upper limit value) for a long period of time, the load imposed on an electrical part or the like increases. This may shorten the product life. In an air-conditioning apparatus according to Embodiment 5, by changing the actuator control value according to the target set temperature T5 and a time to5, which is a thermo-ON time, the high-side pressure is reduced. For example, in order to reduce the high-side pressure, the air volume of the outdoor fan 5 is increased to an air volume corresponding to the target set temperature T5. Accordingly, the high-side pressure is reduced to a target high-side pressure Pdc at which the load to be applied on an electrical part can be ensured with respect to the product life even when a continuous operation is performed. The configuration of the air-conditioning apparatus according to Embodiment 5 is similar to the air-conditioning apparatus according to Embodiment 1 described above.

Figure 9:
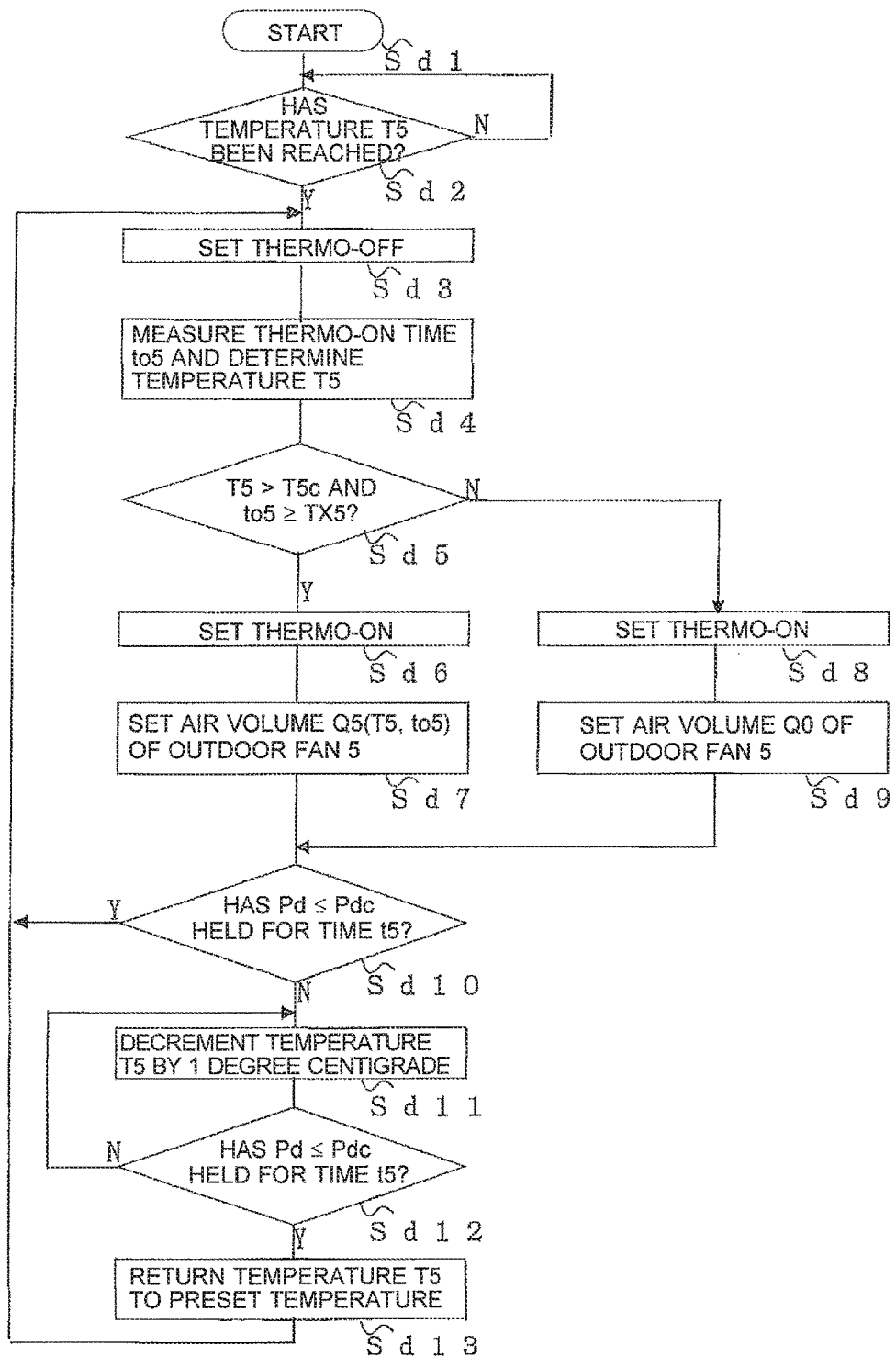
FIG. 9 is a flowchart of a process by the controller 9 according to Embodiment 5 of the present invention.

FIG. 9 is a flowchart of a process by the controller 9 according to Embodiment 5 of the present invention. The sequence of the control process, which is a feature of Embodiment 5, will be explained in detail with reference to FIG. 9. First, when an operation instruction is transmitted to the controller 9, the operation of the air-conditioning apparatus is started (step Sd1). At this time, the target set temperature T5 is set by the user. Then, it is determined whether the target set temperature T5 has been reached by execution of a cooling operation for cooling a room (step Sd2). When it is determined that the target set temperature T5 has been reached, the indoor unit 400 is stopped (thermo-OFF) (step Sd3). At this time, measurement of the time to5 in the thermo-ON state and a determination of the target set temperature T5 are performed (step Sd4).

For example, when the target set temperature T5 is set close to the set upper limit temperature T0$c$, due to the proximity to the boundary of a unit operation range, it may take a certain time to make a shift from normal operation to a stable operation state. Thus, by setting an optimal actuator control value according to the target set temperature T5 and the thermo-ON time to5, the room temperature can be stabilized in a short period of time.

Therefore, it is determined whether the target set temperature T5 is higher than a second target set temperature T5$c$ and the thermo-ON time t05 is equal to or longer than a reference time TX5 (step Sd5). When it is determined that the target set temperature T5 is not higher than the second target set temperature T5$c$ or the thermo-ON time to5 is shorter than the reference time TX5, this means that the load to be applied on an electrical part or the like can ensure an expected product life, and after the room temperature reaches the target set temperature T5 and the thermo-ON state is entered (step Sd8), normal control is performed. Then, the air volume of the outdoor fan 5 is set to a predetermined air volume Q0 (step Sd9).

In contrast, when it is determined that the target set temperature T5 is higher than the second target set temperature T5$c$ and the thermo-ON time to5 is equal to or higher than the reference time TX5, after the thermo-ON state is entered (step Sd6), for example, the air volume Q5 of the outdoor fan 5 (T5, to5) is set in accordance with the target set temperature T5 and the thermo-ON time to5 (step Sd7).

When the target set temperature T5 is high (the room temperature increases), the low-side pressure detected by the second pressure sensor 11 increases, and the high-side pressure detected by the first pressure sensor 10 increases. Therefore, when a preset control target value for the high-side pressure is reached, and the compressor frequency or the like is reduced to keep the target value (upper limit value), the heat exchange capacity may be reduced. In addition, by keeping the target value (upper limit value) for the high-side pressure for a long period of time, the load imposed on an electrical part or the like may increase, thus shortening the product life. Thus, the phenomenon described above may be corrected by changing the actuator control in accordance with the target set temperature T5 and the thermo-ON time to5.

It is determined whether, for example, the condition in which the high-side pressure Pd detected by the first pressure sensor 10 is equal to or lower than the reference high-side pressure Pdc has held for a time t5 (step Sd10). When it is determined that the condition in which the high-side pressure Pd is equal to or lower than the reference high-side pressure Pdc has held for the time t5, this means that the load can be suppressed to ensure the product life of an electrical part. Then, the process returns to step Sd2, in which the process continues. Note that in consideration of the load imposed on an electrical part during the last operation based on the thermo-ON time to5, the reference high-side pressure Pdc is set to a pressure corresponding to the thermo-ON time to5, to ensure the product life.

In contrast, when the high-side pressure Pd is higher than the reference high-side pressure Pdc in step Sd9, this means that it is difficult to perform the aforementioned control process by controlling only the air volume Q5(T5, to5) of the outdoor fan 5, the air-conditioning environment is changed. For example, the target set temperature T5 is further decremented by, for example, 1 degree Centigrade (Sd11). By setting the target set temperature T5 low, the high-side pressure is expected to reduce.

After the target set temperature T1 is decremented by 1 degree Centigrade in step Sd11, it is again determined whether the condition in which the high-side pressure Pd is equal to or lower than the high-side pressure Pdc has held for the time t5 to, in turn, determine whether the product life of an electrical part may be ensured (step Sd12). When it is determined that the condition in which the high-side pressure Pd is equal to or lower than the high-side pressure Pdc has not held for the time t5, the process returns to step Sd11, and the target set temperature T5 is further decremented by 1 degree Centigrade. This processing is repeated and ends when the condition in which the high-side pressure Pd is equal to or lower than the high-side pressure Pdc has held for the time t5.

When it is determined in step Sd11 that the high-side pressure Pd is equal to or lower than the reference high-side pressure Pdc, the target set temperature T5 is returned to the preset temperature (step Sd13). Then, the process proceeds to step Sd2, in which the operation continues.

As described above, with the air-conditioning apparatus according to Embodiment 5, by execution of the process with the controller 9, in an operation in which a target set temperature is set close to the set upper limit temperature T0$c$, a stable control may be achieved in a short period of time, without shortening the product life of an electrical part provided in the air-conditioning apparatus with high load.

Embodiment 6

For example, in Embodiment 1 and the like described above, the target set temperature T1 and the second target set temperature T1$c$, which are closer to the set upper limit temperature T0$c$, and the target set temperature T2 and the second target set temperature T2$h$, which are closer to the set lower limit temperature T0$h$, are set. However, temperature settings are not limited as described above. Only the target set temperature T1 and the second target set temperature T1$c$ or the target set temperature T2 and the second target set temperature T2$h$ may be set.

The invention claimed is:

1. An air-conditioning apparatus comprising:
an outdoor unit that includes a compressor which compresses a refrigerant and discharges the compressed refrigerant, an outdoor heat exchanger which exchanges heat between outside air and the refrigerant, a switching valve for switching a flow passage of the refrigerant, and an outdoor flow control valve which controls a flow rate of the refrigerant; and
an indoor unit that includes an indoor heat exchanger which exchanges heat between air to be conditioned and the refrigerant, and an indoor flow control valve which reduces a pressure of the refrigerant, the outdoor unit and at least one indoor unit being connected by pipes to form a refrigerant circuit,
wherein the air-conditioning apparatus further comprises a controller that controls a component of the refrigerant circuit, based on a relationship between a first target set temperature that is set for temperature control of the air to be conditioned and a second target set temperature that is set to protect constituent devices, so that the temperature of the air to be conditioned reaches the first target set temperature, and
wherein the controller stores a control change temperature, as a reference for changing a defrosting operation determination process, and
when it is determined that the first target set temperature is lower than the control change temperature and is equal to or lower than the temperature of the air to be conditioned, the controller controls the temperature of the air to be conditioned by raising the first target set temperature to reduce changes between a thermo-ON state and a thermo-OFF state of the indoor unit.

2. The air-conditioning apparatus of claim 1, wherein
when it is determined that the first target set temperature is set lower than the second target set temperature, the controller sets the first target set temperature and controls the outdoor flow control valve so that the temperature of the air to be conditioned reaches the second target set temperature, and
the second target set temperature is set in correspondence with a settable lower limit temperature.

3. The air-conditioning apparatus of claim 1, wherein
when it is determined that the first target set temperature is set lower than the second target set temperature, the controller sets the first target set temperature and controls a driving frequency of the compressor so that the temperature of the air to be conditioned reaches the second target set temperature, and
the second target set temperature is set in correspondence with a settable lower limit temperature.

4. The air-conditioning apparatus of claim 1, further comprising:
an outdoor fan that sends outside air to the outdoor heat exchanger, wherein
when it is determined that the first target set temperature is set higher than the second target set temperature, the controller sets the first target set temperature and controls the outdoor fan so that the temperature of the air to be conditioned reaches the second target set temperature, and
the second target set temperature is set in correspondence with a settable upper limit temperature.

5. The air-conditioning apparatus of claim 1, wherein
when it is determined that the first target set temperature is set higher than the second target set temperature, the controller sets the first target set temperature and controls a driving frequency of the compressor so that the temperature of the air to be conditioned reaches the second target set temperature, and
the second target set temperature is set in correspondence with a settable upper limit temperature.

6. The air-conditioning apparatus of claim 1, wherein the second target set temperature, which is set in advance, is allowed to be changed by a switch provided in the controller or by changing control software installed in the controller.

7. The air-conditioning apparatus of claim 1, wherein the controller controls the component, based on a relationship between the first target set temperature and the second target set temperature, to prevent damage to the compressor when an operation in which start and stop of the compressor are frequently repeated continues and the liquid refrigerant in the compressor is thus hindered from evaporating.

8. An air-conditioning apparatus comprising:
an outdoor unit that includes a compressor which compresses a refrigerant and discharges the compressed refrigerant, an outdoor heat exchanger which exchanges heat between outside air and the refrigerant, a switching valve for switching a flow passage of the refrigerant, and an outdoor flow control valve which controls a flow rate of the refrigerant; and
an indoor unit that includes an indoor heat exchanger which exchanges heat between air to be conditioned and the refrigerant, and an indoor flow control valve which reduces a pressure of the refrigerant, the outdoor unit and at least one indoor unit being connected by pipes to form a refrigerant circuit,
wherein the air-conditioning apparatus further comprises a controller that controls a component of the refrigerant circuit, based on a relationship between a first target set temperature that is set for temperature control of the air to be conditioned and a second target set temperature that is set to protect constituent devices, so that temperature of the air to be conditioned reaches the first target set temperature, and
wherein the controller controls a driving frequency of the compressor, based on a temperature difference between two values of the first target set temperature which are set to fall within a range between a set upper limit temperature and a set lower limit temperature, so that a variation range of a change in speed of the compressor increases as the temperature difference increases.

9. An air-conditioning apparatus comprising:
an outdoor unit that includes a compressor which compresses a refrigerant and discharges the compressed refrigerant, an outdoor heat exchanger which exchanges heat between outside air and the refrigerant, a switching valve for switching a flow passage of the refrigerant, and an outdoor flow control valve which controls a flow rate of the refrigerant; and
an indoor unit that includes an indoor heat exchanger which exchanges heat between air to be conditioned and the refrigerant, and an indoor flow control valve which reduces a pressure of the refrigerant, the outdoor unit and at least one indoor unit being connected by pipes to form a refrigerant circuit, wherein the air-conditioning apparatus further comprises a controller that controls a component of the refrigerant circuit, based on a relationship between a first target set temperature that is set for temperature control of the air to be conditioned and a second target set temperature that is set to protect constituent devices, so that temperature of the air to be conditioned reaches the first target set temperature, wherein the controller controls a driving frequency of the compressor, based on a temperature difference $\Delta T$, so that a variation range of a change in speed of the compressor increases as the temperature difference $\Delta T$ increases, the temperature difference $\Delta T$ being determined based on a relationship between two values $TA1$ and $TA2$ of the first target set temperature and two values $TB1$ and $TB2$ of the second target set temperature, wherein the two values $TA1$ and $TA2$ of the first target set temperature and the two values $TB1$ and $TB2$ of the second target set temperature are set to fall within a range between a set upper limit temperature and a set lower limit temperature, and wherein, when $TA1>TB1$ and $TA2<TB2$ are satisfied, the temperature difference $\Delta T$ is determined as $\Delta T=TB1-TB2$, when $TA\leq TB1$ and $TA2<TB2$ are satisfied, the temperature difference $\Delta T$ is determined as $\Delta T=TA1-TB2$, when $TA1>TB1$ and $TA2\geq TB2$ are satisfied, the temperature difference $\Delta T$ is determined as $\Delta T=TB1-TA2$, and when $TA1\leq TB1$ and $TA2\geq TB2$ are satisfied, the temperature difference $\Delta T$ is determined as $\Delta T=TA1-TA2$.

* * * * *